UNITED STATES PATENT OFFICE.

OTTO J. E. VOGELBACH AND JOHN CHRISTIAN WIELAND, OF PHILADELPHIA, PENNSYLVANIA, AND CHRISTIAN F. RILEY, OF ATLANTIC CITY, N. J.

ARTIFICIAL STONE OR BUILDING-BLOCK AND PROCESS OF MAKING THE SAME.

SPECIFICATION forming part of Letters Patent No. 309,586, dated December 23, 1884.

Application filed June 9, 1884. (No specimens.)

*To all whom it may concern:*

Be it known that we, OTTO J. E. VOGELBACH and JOHN CHRISTIAN WIELAND, of Philadelphia, Pennsylvania, and CHRISTIAN F. RILEY, of Atlantic City, New Jersey, have invented a new and useful Artificial Stone or Building-Block and Process of Making the Same, of which the following is a full, true, and accurate description.

The object of our invention is to provide a building-block which shall be uninjured by atmospheric changes, and both strong and cheap enough to be a safe and economical substitute for brick and stone.

Our invention accordingly consists of the following compound block and method of making the same: We make a semi-liquid or pasty mixture of ground hydraulic cement and water. To this we add gradually a mixture of ordinary ocean-beach sand and hydrous silicate of allumina containing free silica. The mud of salt marshes near the ocean we have found to be the best form in which this ingredient can be obtained, and it is peculiarly suitable to our compound, both in its chemical proportions and the physical condition of its compounds. The mud and sand are thoroughly mixed together before being stirred into the cement, as aforesaid, and when this has been done we add to the mixture a solution of silicate of soda. The mass, which is of the consistency of an ordinary brick-clay, is then pressed into the blocks or bricks in brick-presses or otherwise, and then dried in the sun and air for six or more days, after which it is ready for use.

The proportions in which the above ingredients may be used may be considerably varied. For very fine blocks, which in finish and quality resemble the better kinds of pressed bricks, we use of hydraulic cement six-seventeenths, ($\frac{6}{17}$;) of sand, six-seventeenths, ($\frac{6}{17}$;) of marsh-mud, four-seventeenths, ($\frac{4}{17}$;) and of silicate of soda, one-seventeenth, ($\frac{1}{17}$.) Blocks resembling common brick we make by using of hydraulic cement, three-seventeenths, ($\frac{3}{17}$;) of sand, nine-seventeenths, ($\frac{9}{17}$;) of marsh-mud, four-seventeenths, ($\frac{4}{17}$;) and of silicate of soda, one-seventeenth ($\frac{1}{17}$).

Without confining ourselves strictly to the proportions given, we recommend that those above specified should be substantially followed, according to the quality of block desired, as we have found them to give good results.

Coloring-matter may be added to the mixture before it hardens, by which it may be made to resemble brick or other building materials.

Having now described our invention, what we claim as new, and desire to secure by Letters Patent, is—

1. As a new article of manufacture, a building-block composed of hydraulic cement, sand, marsh-mud, and silicate of soda, in substantially the proportions specified.

2. As a new article of manufacture, a building-block composed of hydraulic cement, sand, marsh-mud, and silicate of soda, in substantially the proportions specified, pressed and dried without burning.

3. The process of making an artificial building-block, which consists in adding to a pasty mixture of hydraulic cement and water a mixture of sand and marsh mud, and to this mixture a solution of silicate of soda, all in proportions substantially as specified, and pressing the resultant compound into blocks.

In witness whereof we have hereunto set our hands.

OTTO J. E. VOGELBACH.
JOHN CHRISTIAN WIELAND.
CHRISTIAN F. RILEY.

Witnesses:
JOHN AUGT. WIELAND,
SAMUEL E. COPE.